(12) United States Patent
Krylov et al.

(10) Patent No.: US 10,721,251 B2
(45) Date of Patent: Jul. 21, 2020

(54) METHOD AND SYSTEM FOR DETECTING REMOTE ACCESS DURING ACTIVITY ON THE PAGES OF A WEB RESOURCE

(71) Applicant: Group IB, Ltd, Moscow (RU)

(72) Inventors: Pavel Vladimirovich Krylov, Moscow (RU); Ilya Konstantinovich Sachkov, Moscow (RU)

(73) Assignee: Group IB, Ltd, Moscow (RU)

( * ) Notice: Subject to any disclaimer, the term of this patent is extended or adjusted under 35 U.S.C. 154(b) by 0 days.

(21) Appl. No.: 16/261,854

(22) Filed: Jan. 30, 2019

(65) Prior Publication Data

US 2019/0166140 A1    May 30, 2019

Related U.S. Application Data

(63) Continuation of application No. PCT/RU2016/000526, filed on Aug. 9, 2016.

(30) Foreign Application Priority Data

Aug. 3, 2016    (RU) .................. 2016131909

(51) Int. Cl.
*H04L 29/06*    (2006.01)
*H04L 29/08*    (2006.01)
(Continued)

(52) U.S. Cl.
CPC ........ *H04L 63/1416* (2013.01); *G06F 3/0354* (2013.01); *G06F 21/554* (2013.01);
(Continued)

(58) Field of Classification Search
CPC ......... H04L 51/04; H04L 51/20; H04L 51/36; H04L 51/30; H04L 51/24; H04L 51/06;
(Continued)

(56) References Cited

U.S. PATENT DOCUMENTS

| | | | |
|---|---|---|---|
| 7,225,343 | B1 | 5/2007 | Honig et al. |
| 7,496,628 | B2 | 2/2009 | Arnold et al. |

(Continued)

FOREIGN PATENT DOCUMENTS

| | | |
|---|---|---|
| CN | 103491205 A | 1/2014 |
| CN | 104504307 A | 4/2015 |

(Continued)

OTHER PUBLICATIONS

Office Action with regard to the counterpart U.S. Appl. No. 15/707,641 dated Apr. 25, 2019.

(Continued)

*Primary Examiner* — Joseph P Hirl
*Assistant Examiner* — Thomas A Gyorfi
(74) *Attorney, Agent, or Firm* — BCF LLP

(57) ABSTRACT

Non-limiting embodiments of the present technology are directed to a field of computer science, and particularly to the methods and systems for remote access detection when browsing web resource pages. A method comprises receiving data representative of a periodicity of a computer mouse movement events; generating a statistical model, the statistical model representative of a typical periodicity of the computer mouse movement events associated with a legitimate user of the electronic device; receiving an indication of computer mouse movement events from the electronic device during a browsing session of the web resource; comparing a periodicity of the computer mouse movement events with the statistical model; in response to detecting a deviation in computer mouse movement events, generating a notification determining a presence of a remote connection to the browsing session; transmitting the notification to an entity associated with the web resources.

7 Claims, 4 Drawing Sheets

(51) Int. Cl.
*G06F 3/0354* (2013.01)
*G06N 20/00* (2019.01)
*G06N 5/04* (2006.01)
*G06F 21/55* (2013.01)
*G06F 21/31* (2013.01)

(52) U.S. Cl.
CPC .............. *G06N 5/048* (2013.01); *G06N 20/00* (2019.01); *H04L 67/025* (2013.01); *H04L 67/22* (2013.01); *G06F 21/31* (2013.01)

(58) Field of Classification Search
CPC ......... H04L 51/14; H04L 51/08; H04L 63/08; H04L 63/102; H04W 4/12; G06F 21/10; G06F 2221/2111; G06Q 10/107
See application file for complete search history.

(56) References Cited

U.S. PATENT DOCUMENTS

| | | | |
|---|---|---|---|
| 7,712,136 | B2 | 5/2010 | Sprosts et al. |
| 7,730,040 | B2 | 6/2010 | Reasor et al. |
| 7,865,953 | B1 | 1/2011 | Hsieh et al. |
| 7,958,555 | B1 | 6/2011 | Chen et al. |
| 7,984,500 | B1 | 7/2011 | Khanna et al. |
| 8,132,250 | B2 | 3/2012 | Judge et al. |
| 8,151,341 | B1 | 4/2012 | Gudov |
| 8,255,532 | B2 | 8/2012 | Smith-Mickelson et al. |
| 8,260,914 | B1 | 9/2012 | Ranjan |
| 8,402,543 | B1 | 3/2013 | Ranjan et al. |
| 8,448,245 | B2 | 5/2013 | Banerjee et al. |
| 8,532,382 | B1 | 9/2013 | Ioffe |
| 8,539,582 | B1 | 9/2013 | Aziz et al. |
| 8,555,388 | B1 | 10/2013 | Wang et al. |
| 8,561,177 | B1 | 10/2013 | Aziz et al. |
| 8,600,993 | B1 | 12/2013 | Gupta et al. |
| 8,612,463 | B2 | 12/2013 | Brdiczka et al. |
| 8,625,033 | B1 | 1/2014 | Marwood et al. |
| 8,635,696 | B1 | 1/2014 | Aziz |
| 8,650,080 | B2 | 2/2014 | O'Connell et al. |
| 8,660,296 | B1 | 2/2014 | Ioffe |
| 8,677,472 | B1 * | 3/2014 | Dotan ................ H04L 67/22 726/12 |
| 8,776,229 | B1 | 7/2014 | Aziz |
| 8,850,571 | B2 | 9/2014 | Staniford et al. |
| 8,856,937 | B1 | 10/2014 | Wüest et al. |
| 8,972,412 | B1 | 3/2015 | Christian et al. |
| 8,984,640 | B1 | 3/2015 | Emigh et al. |
| 9,060,018 | B1 | 6/2015 | Yu et al. |
| 9,210,111 | B2 | 12/2015 | Chasin et al. |
| 9,215,239 | B1 | 12/2015 | Wang et al. |
| 9,253,208 | B1 | 2/2016 | Koshelev |
| 9,330,258 | B1 | 5/2016 | Satish et al. |
| 9,357,469 | B2 | 5/2016 | Smith et al. |
| 9,456,000 | B1 | 9/2016 | Spiro et al. |
| 9,654,593 | B2 | 5/2017 | Garg et al. |
| 9,723,344 | B1 | 8/2017 | Granström et al. |
| 9,736,178 | B1 | 8/2017 | Ashley |
| 9,917,852 | B1 | 3/2018 | Xu et al. |
| 9,934,376 | B1 | 4/2018 | Ismael |
| 2002/0161862 | A1 * | 10/2002 | Horvitz ................ G06Q 10/107 709/220 |
| 2003/0009696 | A1 | 1/2003 | Bunker et al. |
| 2006/0074858 | A1 | 4/2006 | Etzold et al. |
| 2006/0107321 | A1 | 5/2006 | Tzadikario |
| 2006/0224898 | A1 | 10/2006 | Ahmed |
| 2006/0253582 | A1 | 11/2006 | Dixon et al. |
| 2007/0019543 | A1 | 1/2007 | Wei et al. |
| 2009/0138342 | A1 | 5/2009 | Otto et al. |
| 2009/0281852 | A1 | 11/2009 | Abhari et al. |
| 2009/0292925 | A1 | 11/2009 | Meisel |
| 2010/0037314 | A1 | 2/2010 | Perdisci et al. |
| 2010/0076857 | A1 | 3/2010 | Deo et al. |
| 2010/0115621 | A1 | 5/2010 | Staniford et al. |
| 2010/0191737 | A1 | 7/2010 | Friedman et al. |
| 2010/0205665 | A1 | 8/2010 | Komili et al. |
| 2010/0235918 | A1 | 9/2010 | Mizrahi et al. |
| 2011/0222787 | A1 | 9/2011 | Thiemert et al. |
| 2012/0030293 | A1 | 2/2012 | Bobotek |
| 2012/0079596 | A1 | 3/2012 | Thomas et al. |
| 2012/0087583 | A1 | 4/2012 | Yang et al. |
| 2012/0158626 | A1 | 6/2012 | Zhu et al. |
| 2012/0233656 | A1 | 9/2012 | Rieschick et al. |
| 2012/0291125 | A1 | 11/2012 | Maria |
| 2013/0086677 | A1 | 4/2013 | Ma et al. |
| 2013/0103666 | A1 | 4/2013 | Sandberg et al. |
| 2013/0111591 | A1 | 5/2013 | Topan et al. |
| 2013/0117848 | A1 | 5/2013 | Golshan et al. |
| 2013/0191364 | A1 | 7/2013 | Kamel et al. |
| 2013/0263264 | A1 | 10/2013 | Klein et al. |
| 2013/0297619 | A1 | 11/2013 | Chandrasekaran et al. |
| 2013/0340080 | A1 | 12/2013 | Gostev et al. |
| 2014/0033307 | A1 | 1/2014 | Schmidtler |
| 2014/0058854 | A1 | 2/2014 | Ranganath et al. |
| 2014/0082730 | A1 | 3/2014 | Vashist et al. |
| 2014/0173287 | A1 | 6/2014 | Mizunuma |
| 2014/0310811 | A1 | 10/2014 | Hentunen |
| 2015/0007250 | A1 | 1/2015 | Dicato, Jr. et al. |
| 2015/0049547 | A1 | 2/2015 | Kim |
| 2015/0067839 | A1 | 3/2015 | Wardman et al. |
| 2015/0163242 | A1 | 6/2015 | Laidlaw et al. |
| 2015/0170312 | A1 | 6/2015 | Mehta et al. |
| 2015/0200963 | A1 | 7/2015 | Geng et al. |
| 2015/0220735 | A1 | 8/2015 | Paithane et al. |
| 2015/0295945 | A1 | 10/2015 | Canzanese et al. |
| 2015/0363791 | A1 | 12/2015 | Raz et al. |
| 2015/0381654 | A1 | 12/2015 | Wang et al. |
| 2016/0036837 | A1 | 2/2016 | Jain et al. |
| 2016/0036838 | A1 | 2/2016 | Jain et al. |
| 2016/0044054 | A1 | 2/2016 | Stiansen et al. |
| 2016/0065595 | A1 | 3/2016 | Kim et al. |
| 2016/0112445 | A1 | 4/2016 | Abramowitz |
| 2016/0149943 | A1 | 5/2016 | Kaloroumakis et al. |
| 2016/0191243 | A1 | 6/2016 | Manning |
| 2016/0205122 | A1 | 7/2016 | Bassett |
| 2016/0205123 | A1 | 7/2016 | Almurayh et al. |
| 2016/0261628 | A1 | 9/2016 | Doron et al. |
| 2016/0267179 | A1 | 9/2016 | Mei et al. |
| 2016/0285907 | A1 | 9/2016 | Nguyen et al. |
| 2016/0306974 | A1 * | 10/2016 | Turgeman .......... G06Q 20/4016 |
| 2017/0034211 | A1 | 2/2017 | Buergi et al. |
| 2017/0134401 | A1 | 5/2017 | Medvedovsky et al. |
| 2017/0142144 | A1 | 5/2017 | Weinberger et al. |
| 2017/0149813 | A1 | 5/2017 | Wright et al. |
| 2017/0200457 | A1 | 7/2017 | Chai et al. |
| 2017/0230401 | A1 | 8/2017 | Ahmed et al. |
| 2017/0244735 | A1 | 8/2017 | Visbal et al. |
| 2017/0250972 | A1 | 8/2017 | Ronda et al. |
| 2017/0272471 | A1 | 9/2017 | Veeramachaneni et al. |
| 2017/0279818 | A1 | 9/2017 | Milazzo et al. |
| 2017/0286544 | A1 | 10/2017 | Hunt et al. |
| 2017/0289187 | A1 | 10/2017 | Noel et al. |
| 2017/0295157 | A1 | 10/2017 | Chavez et al. |
| 2017/0295187 | A1 | 10/2017 | Havelka et al. |
| 2017/0324738 | A1 | 11/2017 | Hari et al. |
| 2017/0346839 | A1 | 11/2017 | Peppe et al. |
| 2018/0012021 | A1 | 1/2018 | Volkov |
| 2018/0012144 | A1 | 1/2018 | Ding et al. |
| 2018/0034779 | A1 | 2/2018 | Ahuja et al. |
| 2018/0063190 | A1 | 3/2018 | Wright et al. |
| 2018/0096153 | A1 | 4/2018 | Dewitte et al. |
| 2018/0115573 | A1 | 4/2018 | Kuo et al. |
| 2018/0268464 | A1 | 9/2018 | Li |
| 2018/0307832 | A1 | 10/2018 | Ijiro et al. |
| 2018/0309787 | A1 | 10/2018 | Evron et al. |
| 2019/0089737 | A1 | 3/2019 | Shayevitz et al. |
| 2019/0207973 | A1 | 7/2019 | Peng |
| 2020/0134702 | A1 | 4/2020 | Li |

FOREIGN PATENT DOCUMENTS

| | | |
|---|---|---|
| CN | 105429956 A | 3/2016 |
| CN | 105897714 A | 8/2016 |
| CN | 106131016 A | 11/2016 |

(56) References Cited

FOREIGN PATENT DOCUMENTS

| | | |
|---|---|---|
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion dated Aug. 5, 2019 with regard to the counterpart SG Patent Application No. 10201900339Q.
Invitation to Respond to Written Opinion dated Aug. 5, 2019 with regard to the counterpart SG Patent Application No. 10201901079U.
Invitation to Respond to Written Opinion dated Jul. 31, 2019 with regard to the counterpart SG Patent Application No. 10201900335P.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year: 2005)—in the Notice of Allowance with regard to the counterpart U.S. Appl. No. 15/707,641.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Office Action with regard to the counterpart U.S. Appl. No. 15/858,013 dated Nov. 22, 2019.
English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol . E93A, No. 1, p.p. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", Infocom, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Office Action received with regard to the counterpart U.S. Appl. No. 15/858,032 dated Apr. 6, 2020.
Notice of Allowance with regard to the counterpart U.S. Appl. No. 15/858,013 dated May 8, 2020.
Office Action with regard to counterpart U.S. Appl. No. 16/270,341 dated May 27, 2020.

* cited by examiner

METHOD AND SYSTEM FOR DETECTING REMOTE ACCESS DURING ACTIVITY ON THE PAGES OF A WEB RESOURCE

CROSS-REFERENCE

The present application is a Continuation of International Patent Application no. PCT/RU2016/000526, filed on Aug. 9, 2016, entitled "METHOD AND SYSTEM FOR DETECTING REMOTE ACCESS DURING ACTIVITY ON THE PAGES OF A WEB RESOURCE", which claims convention priority to Russian Patent Application 2016131909, filed on Aug. 3, 2016, the entirety of which is incorporated herein by reference.

FIELD

This technical solution refers to the field of computer science, and particularly to the methods and systems of remote access detection when browsing web resource pages using an electronic device.

BACKGROUND

Recently, the use of electronic keys (tokens) and smart cards with non-recoverable cryptographic keys, which are used to sign legally significant documents and money transfers, has ceased to be considered a reliable method of protection against fraudsters. The most common scheme to bypass these means is the use of malicious software for unauthorized collection of login information, PIN codes, passwords on the "victim's" device, followed by remote access to his/her device and performing actions in information systems as if the legitimate user.

Such attacks have ceased to be isolated and are particularly widely used by cyber fraudsters in the theft of money through various online payment systems and remote banking services. Such publicly available programs as Microsoft Remote Desktop, TeamViewer, Lite Manager, Ammyy Admin, Remote Admin, a VNC-based family are often used for remote access.

The most known method to detect the use of remote access is to record changes in screen parameters, such as its width and height, as well as colour depth. For example, in case of remote control using Microsoft Remote Desktop, the default screen settings from which remote access is performed are used. These screen parameters are accessible through JavaScript, and can be read when the user accesses the web resource accordingly. This method uses a wide range of antifraud solutions, such as ThreatMetrix, RSA Transaction Monitoring, NICE Actimize, Kaspersky Fraud Prevention, etc.

However, in case of Microsoft Remote Desktop use, the fraudster can explicitly set the necessary screen parameters, and when using other remote access tools such as VNC, Ammyy Admin, TeamViewer, these default parameters typically correspond to the screen settings of the controlled device. In this case, the remote connection using the said method will not be revealed, and this is its significant disadvantage.

SUMMARY

This technology is aimed at elimination of disadvantages inherent to the existing solutions.

The technical problem addressed by at least some of the non-limiting embodiments of the present technology is the identification of a remote connection when browsing on the web resource pages on an electronic device, the detection being executed without special programs, and using browser tools only.

The technical result is the expansion of the technical means range for remote connection detection based on data associated with the computer mouse interrupt.

The non-limiting embodiments of the present technology are based on the following appreciation of the developers of the present technology in regard to the prior art approaches to detection of unauthorized used of browsing sessions. The prior art approaches for remote connection detection that are executed without the use of an agent that can analyse the ports being opened and the communication protocols consist in identifying whether the screen resolution or colour depth has changed. For example, in case of normal use of a given electronic device by a user, the screen has a resolution of 1024×768 pixels and a colour depth of 32 bits. In case of remote connection using RDP (Remote Desktop Protocol), by default, the remote control client uses the screen resolution of another electronic device from which the access is performed, not the given electronic device being accessed. As a result, the screen resolution changes and, for example, this can be determined using a JavaScript app from a browser. The value of the colour depth can also be reduced in respect to the original value in order to reduce the amount of traffic between the control and the controlled devices.

Unfortunately, these methods do not work in most of actual cases. Firstly, it does not work against those fraudsters who have the ability to receive the original resolution and colour depth values and manually set them in the parameters of the remote access client. Secondly, such widely used remote access systems as VNC, TeamViewer, LiteManager, Remote Admin, Ammyy Admin do not change either the resolution or colour depth by default.

This technical solution offers a new way to identify a remote connection, which defines the use of all the said remote connection programs by taking into account the fundamental principles of their work.

In accordance with a first broad aspect of the non limiting embodiments of the present technology, there is provided a method of remote connection detection when browsing a web resource page using an electronic device, the method executable by a server communicatively coupled to the electronic device. The method comprises: receiving, by the server from the electronic device, data representative of a periodicity of a computer mouse movement events; generating, by the server using a machine learning algorithm based on the data, a statistical model, the statistical model representative of a typical periodicity of the computer mouse movement events associated with a legitimate user of the electronic device; receiving, by the server, an indication of computer mouse movement events from the electronic device during a browsing session of the web resource; comparing, by the server, a periodicity of the computer mouse movement events with the statistical model; in response to detecting a deviation in computer mouse movement events, generating a notification determining, by the server, a presence of a remote connection to the browsing session; transmitting, by the server, the notification to an entity associated with the web resources.

In some implementation of the method, the data on the periodicity of computer mouse movement events comprises a median and a dispersion of a time measurement set distribution between adjacent calls of mouse movement events.

In some implementation of the method, the time measurement is expressed in milliseconds.

In some implementation of the method, the generating the statistical model comprises using the machine learning method that is based on at least one of k-nearby neighbours method and linear regression.

In some implementation of the method, the generating the statistical model comprises application of approximating functions for calculating the parameters necessary for detecting the use of remote access means.

In accordance with another broad aspect of the non limiting embodiments of the present technology, there is provided a system for remote connection detection when browsing a web resource page. The system comprises: a server communicatively coupled to an electronic device and configured to: receive data representative of a periodicity of a computer mouse movement events; generate, using a machine learning algorithm based on the data, a statistical model, the statistical model representative of a typical periodicity of the computer mouse movement events associated with a legitimate user of the electronic device; receive an indication of computer mouse movement events from the electronic device during a browsing session of the web resource; compare a periodicity of the computer mouse movement events with the statistical model; in response to detecting a deviation in computer mouse movement events, generate a notification determining a presence of a remote connection to the browsing session; transmit the notification to an entity associated with the web resources.

In some implementation of the system, the server is configured to receive the indication of computer mouse movement events from the electronic device from a browser executed by the electronic device, the browser being configured to load a script for collecting and transmitting data on the periodicity of computer mouse interrupt signal on the electronic device.

BRIEF DESCRIPTION OF THE DRAWINGS

Features and advantages of the non-limiting embodiments of the present technology will become apparent from the below detailed description and accompanying drawings, in which.

DETAILED DESCRIPTION OF THE NON-LIMITING EMBODIMENTS

The non-limiting embodiments of the present technology can be implemented on a computer, in the form of a system or a machine-readable medium containing instructions for using the said method.

The non-limiting embodiments of the present technology can be implemented as a distributed computer system.

In the non-limiting embodiments of the present technology, the system can be implemented as a computer system, PC (personal computer), CNC (computer numeric control), PLC (programmable logic controller), computerized control system and any other devices that can perform defined, clearly determined sequences of operations (actions, instructions).

Command processing device can be implemented as an electronic unit or integral circuit (microprocessor) which executes machine instructions (programs).

A command processing device reads and executes machine instructions (programs) received from one or more data storage devices. Data storage devices include but are not limited to hard drives (HDD), flash memory, ROM (read-only memory), solid-state drives (SSD), optic drives.

In the present description a "program" means a sequence of instructions intended for execution by computer control device or command processing devices.

The terms and concepts required to implement the non-limiting embodiments of the present technology will be described below.

Statistical model—a model that describes (to a greater or lesser extent) the relationship between features (variables).

Machine learning—an extensive subdivision of artificial intelligence, a mathematical discipline using sections of mathematical statistics, numerical optimization methods, probability theory, discrete analysis, and extracting knowledge from data.

Interrupt—a signal informing the processor of the occurrence of an event. Wherein the execution of the current command sequence is suspended and control is transferred to the interrupt handler, which responds to the event, handle it, and then returns control to the interrupted code.

Server—computer and/or equipment for service software execution (including servers of various tasks).

Remote access server provides a user with a thin client that acts as an analogue of a local terminal (text or graphic) to work on the remote system through the appropriate client program. Telnet, RSH and SSH servers are used to provide access to the command line. To provide access to the graphic terminal (shell), such programs as RDP, VNC, TeamViewer, RemoteAdmin, AmmyyAdmin, LiteManager are used.

Browser—an application software for web pages, web documents content, computer files and their folders viewing; web application management; as well as for other tasks.

Computer mouse—a mechanical manipulator that transforms movement into a control signal. In particular, the signal can be used to position the cursor or scroll through pages.

RBS—remote banking service.

In computer science and programming, an event is a message from a software (or part of it) that indicates what happened.

Figure 1:
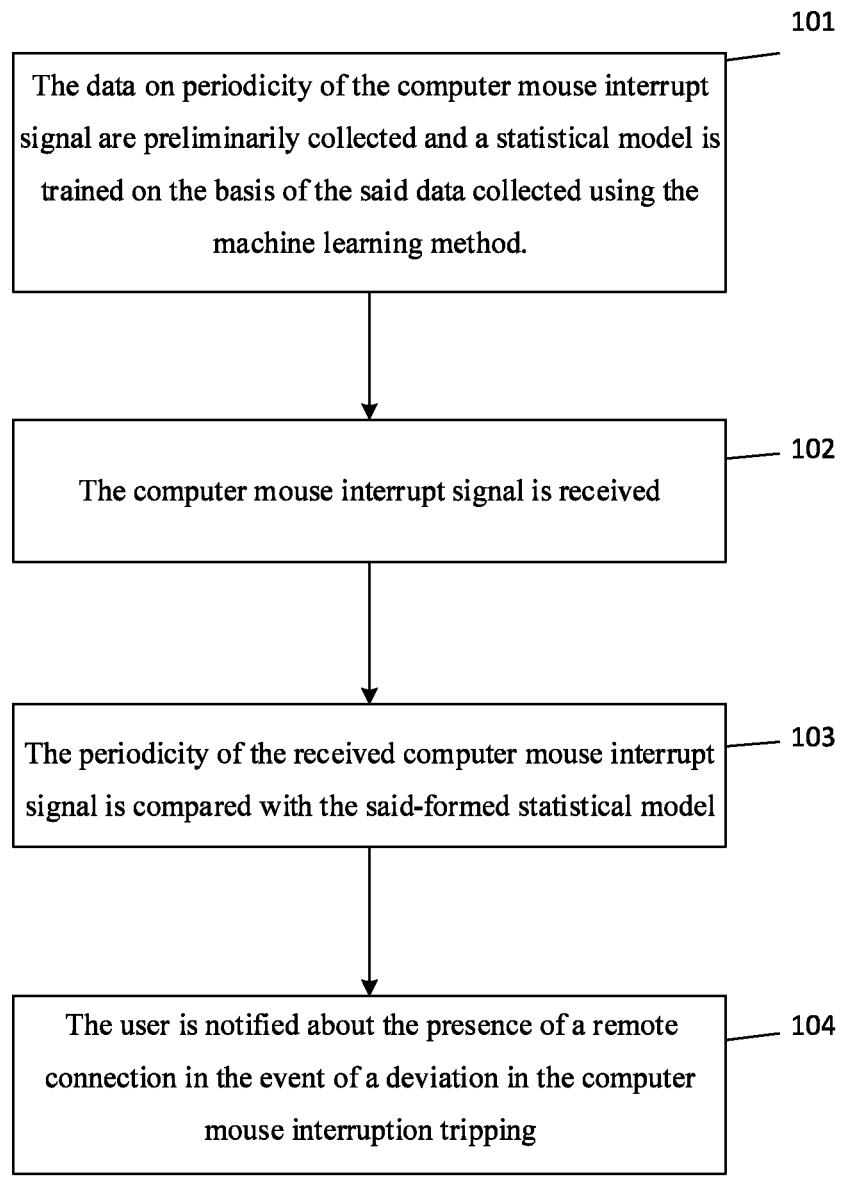
FIG. 1 depicts a non-limiting embodiment of a method of remote connection detection when browsing web resource pages.
Figure 2:
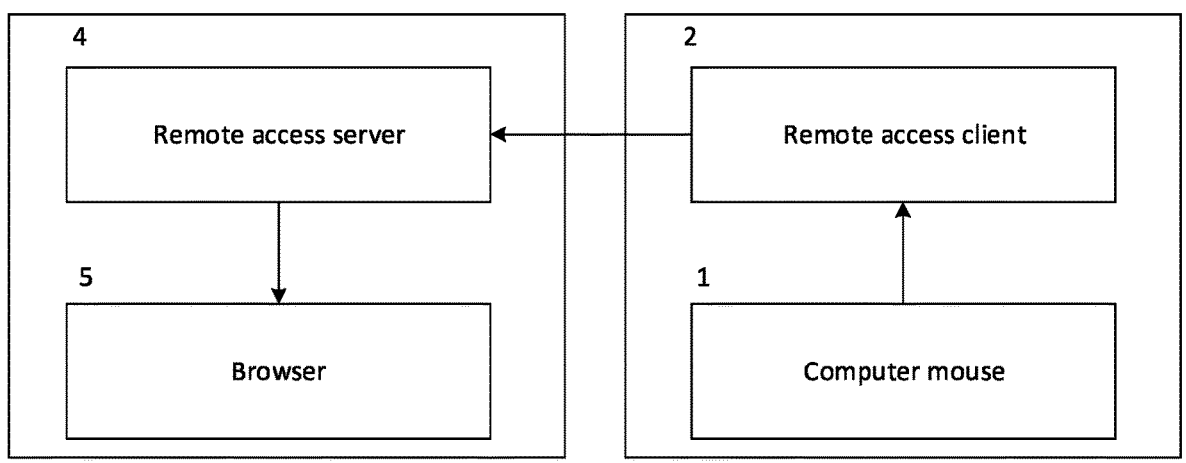
FIG. 2 depicts a non-limiting embodiment of a system for remote connection detection when browsing web resource pages.
Figure 3:
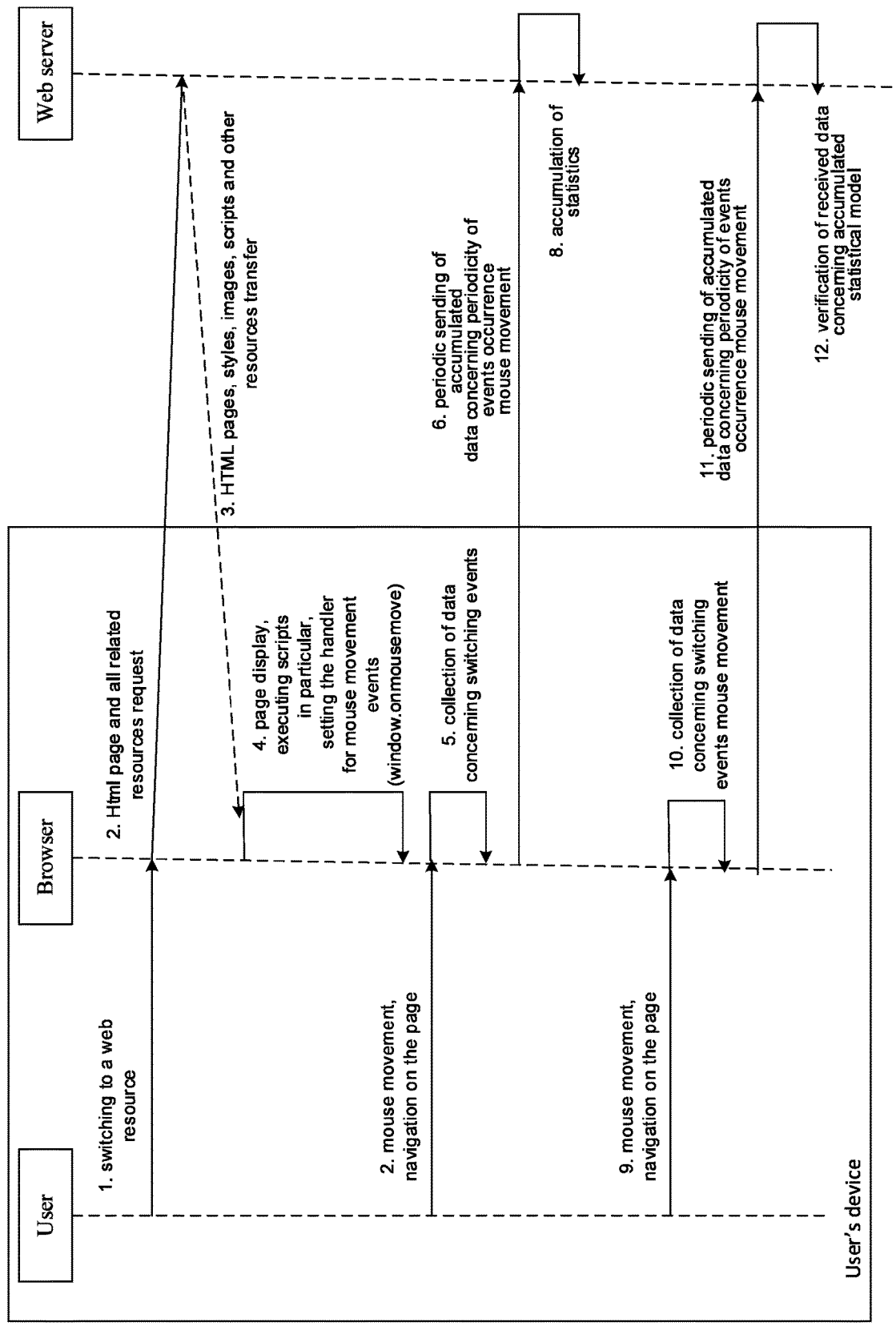
FIG. 3 depicts another non-limiting embodiment of a method for remote connection detection when browsing web resource pages, the FIG. 3 depicting an operation flow of a legitimate user from his/her electronic device on the web resource pages and a sequence of components interaction for the generation of a statistical model and the subsequent verification of the data of a computer mouse interrupt.
Figure 4:
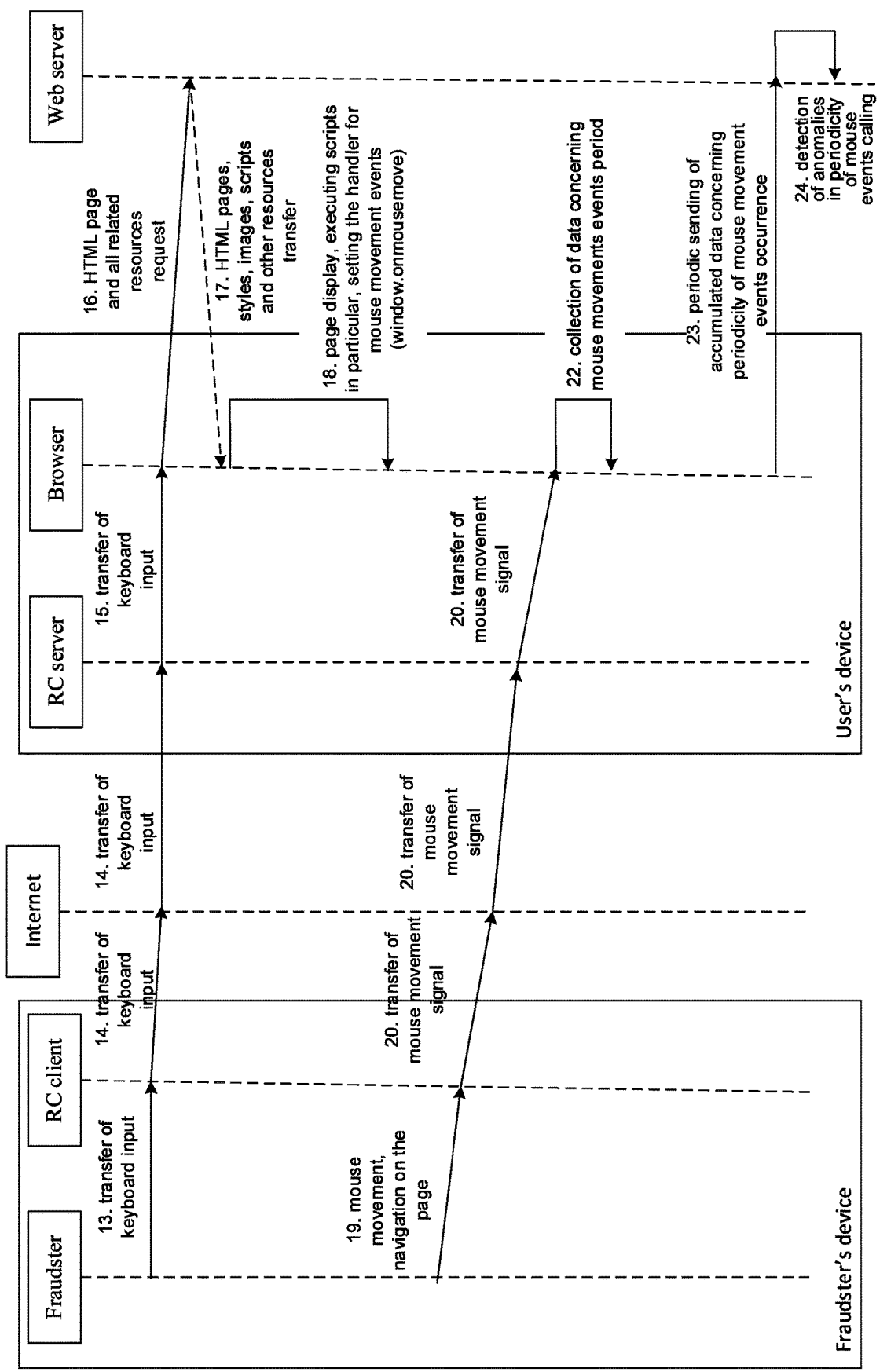
FIG. 4 depicts a non-limiting embodiment of a method of remote connection detection when browsing web resource pages, FIG. 4 depicting steps of using remote access means and making changes to the computer mouse interrupt data, as well as a sequence of interaction of components for identification of the use of remote control means (indicated by thane RC abbreviation).

According to the non-limiting embodiments of the present technology, a method of remote connection detection when browsing web resource pages, which is depicted in FIG. 1, is implemented as follows:

Step 101: data on the periodicity of the computer mouse interrupt signal are collected and a statistical model is trained on the basis of the collected data using a machine learning method.

The data can be represented by a median and the dispersion of the time measurements set distribution (for example, expressed in ms) between adjacent calls of a mouse movement event. The set of measurements has a fixed length. This step is performed during the first user sessions in the browser when visiting a protected web resource. Along with the web resource, JavaScript code is loaded into the client browser, which JavaScript code collects the periodicity of computer mouse interrupts and sends them back to the web server for accumulation and subsequent analysis. A similar approach can be implemented in any application or its extension, which does not have the ability to control open ports on the user's device. For example, if an application is implemented as flash (ActionScript) and runs in a browser, the same method can be used. It should be understood that the above process is implemented when a fraudster has not yet attacked the user's electronic device, and the statistical model obtained during the training reflects the user's work locally on the computing device. To build a statistical model, machine learning methods are used based on the periodicity of the computer mouse response.

The k-nearby neighbours method or linear regression can be used as methods of machine learning, as well as other clustering and anomaly detection algorithms. In conditions of limited data concerning the mouse movement event, it is possible to use approximating functions to calculate the necessary parameters for detecting the use of remote access means. A limited data set means that, as a rule, a fraudster's session under a remote control is rather short (1-2 minutes). This can be a case when the fraudster's task is, for example, to quickly create a payment and leave. Under these conditions, the system cannot collect enough data. Therefore, approximation is used based on the data that have been accumulated. For example, such a function may be represented by the distribution dispersion of N random variables that are necessary to reliably determine the use of remote connection, which can be approximated by the function $a/(N^2)+b$, where the a and b coefficients are calculated on the basis of variances from a smaller number of random variables obtained during a session of work on a protected web resource.

Step 102: computer mouse movement events are received;

Step 103: the periodicity of the received computer mouse interrupt signal is compared with the said formed statistical model.

In general, the data set is compared, because there may be single emissions (anomalies) during normal operation.

The difference between the periodicity of computer mouse interrupt and a statistical model built at the training step is identified. If it turns out to be statistically significant, then a decision is made that there is a remote connection. On the basis of the data obtained on the periodicity of computer mouse interrupt and the statistical model built by the anomaly detection algorithm at the training step, a decision is made that there is a remote control.

Step 104: in case of deviation in computer mouse interrupt the owner of the protected web resource is notified of the presence of a remote connection of the visitor of the web resource for subsequent response from the owner's side. As a response, there may be, for example, restriction of access to the functionality of a web resource, additional authorization of a client, interrupt of a session for a visitor or recall of previously performed actions, etc.

It is noted that in accordance with some of the non-limiting embodiments of the present technology it is not the user of the electronic device who is notified, but the owner of the web resource (the bank in the case of RBS).

An example of the technical solution embodiment is below.

JavaScript code registers its handler for window.onmousemove browser event. The handler is called by the browser when the mouse is moving.

At each call, the difference between the time of the previous call of the interrupt and the current one is measured in the handler. An intermediate array of counters with indices from 0 to a specified number (for example, 40) is used. Each time the handler is called, the counter with an index equal to the time difference between the previous call and the current one is incremented by one. Upon reaching a specified number of successively obtained time differences, the median is calculated. These median values are sent to the server. The array of counters is reset, and the entire iteration described above is repeated.

On the server, the resulting values of the median are accumulated up to the specified number—at this step, the data that belongs to the "user works locally" class are accumulated. The specified number is set by the anomaly detection algorithm settings and is a positive number, for example 100, as shown in the example of embodiment below. Upon receipt of a given number of medians, the following statistical model is calculated:

The average value of the median m and its variance sd;

A threshold value greater than m+3*sd*K is set, where K—is a setting parameter defining detection sensitivity. Only 0.07% of the total normal distribution of medians is within the range of [0, m+3*sd), this interval is taken from statistical theory.

For example, during several sessions of the local client operation in the RBS, the following median values were obtained (in milliseconds):

[9, 10, 11, 11, 11, 9, 11, 10, 11, 11, 11, 11, 11, 11, 11, 9, 9, 11, 11, 9, 11, 11, 11, 11, 12, 13, 13, 12, 9, 9, 9, 9, 9, 9, 9, 9, 9, 9, 9, 9, 9, 9, 9, 9, 9, 9, 11, 11, 11, 11, 11, 10, 9, 11, 11, 11, 11, 11, 11, 9, 9, 9, 9, 9, 9, 9, 9, 9, 9, 9, 9, 9, 9, 9, 9, 9, 9, 13, 13, 13, 13, 13, 13, 11, 11, 11, 11, 11, 11, 9, 9, 9, 9, 9, 9]

m=10.09 sd=1.295641 when K=1, the threshold value is 13.97692

After that, all median values obtained are tested for being within the interval of [0, m+3*sd*K]. If the median is out of range, then remote control is considered to take place. It has a very simple physical meaning: in case of a smooth mouse movement on the side of the fraudster, the signals from it are transmitted from the remote access client to the remote access server with some greater periodicity (delay), which looks like a jerky mouse movement (great leaps) on the controlled device.

Since window.onmousemove events are processed in the common event queue of a single threaded JavaScript machine of the browser, anomalies are possible even during local operation. Therefore, single emissions are not taken into account during estimation. When working remotely, the anomalous values of the median come in groups.

For example, during a work session via TeamViewer, the following median values were obtained: [41, 41, 41, 41, 41]

41 means that the real medians are beyond the array of counters, i.e. delays were more than 40 ms.

As a result, the average of these medians is outside the range of 13.97692.

This method identifies such remote access means as RDP and TeamViewer. Other remote access means require other detection algorithms based on the change in the variance of the window.onmousemove event frequency.

According to the non-limiting embodiments of the present technology, the system of remote connection detection when browsing web resource pages is implemented as follows:

A server is configured to collect data on the periodicity of the computer mouse interrupt signal as well as statistical model training based on the said data using the machine learning method and comparison of the periodicity of the received computer mouse interrupt signal with the said statistical model.

Details of the implementation of data collection on the periodicity of the computer mouse interrupt signal, as well as the training of the statistical model based on the data obtained, are described above.

In any domain, consumer nodes, servers, trunk connections, etc. are considered "local" for this domain, while these elements at another domain are considered as "remote".

a remote access server, configured to receive a signal from a computer mouse from a remote access client;

a remote access client, configured to transmit a signal concerning the computer mouse interrupt to a remote access server;

computer mouse;

browser configured to load a script for collecting and transmitting data on the periodicity of computer mouse interrupt signal on a user's device.

The person skilled in the art can easily implement other variations of the technology from the discussed description disclosed herein. This application is intended to cover any embodiments of the technology, and including such deviations from the present technology, which appear within the limits of known or common practice in the prior art. It is assumed that the description and examples are considered only as exemplary, with the summary and scope of the present technology, indicated by the technical solution claims.

It should be taken into account that the present disclosure is not limited to the precise structures that have been described above and illustrated in the accompanying drawings, and that various modifications and changes can be made without shifting away from its application field. It is assumed that the scope of the technical solution is limited only by the claims attached.

The invention claimed is:

1. A method of remote connection detection when browsing a web resource page using an electronic device, the method executable by a server communicatively coupled to the electronic device, the method comprising:
   receiving, by the server from the electronic device, data representative of a periodicity of interrupt signals of a processor of the electronic device,
      the interrupt signals having been triggered by computer mouse movement events associated with a computer mouse of the electronic device;
   generating, by the server using a machine learning algorithm based on the data, a statistical model, the statistical model representative of a typical periodicity of the interrupt signals associated with a legitimate user of the electronic device;
   receiving, by the server, an indication of the interrupt signals from the electronic device during a given browsing session of the web resource;
   determining, based on the indication of the interrupt signals, a current periodicity of the interrupt signals for the given browsing session;
   comparing, by the server, the current periodicity of the interrupt signals with the typical periodicity of the interrupt signals associated with the legitimate user;
   in response to detecting a deviation between the current periodicity of the interrupt signals and the typical periodicity of the interrupt signals, generating a notification determining, by the server, a presence of a remote connection to the given browsing session;
   transmitting, by the server, the notification to an entity associated with the web resources.

2. The method of claim 1, wherein the data representative of the periodicity of the interrupt signals comprises a median and a dispersion of a time measurement set distribution between adjacent interrupt signals.

3. The method of claim 2, wherein the time measurement is expressed in milliseconds.

4. The method of claim 1, wherein the generating the statistical model comprises using the machine learning method that is based on at least one of k-nearby neighbours method and linear regression.

5. The method of claim 1, wherein the generating the statistical model comprises application of approximating functions for calculating the parameters necessary for detecting use of remote access means.

6. A system for remote connection detection when browsing a web resource page, the system comprising:
   a server communicatively coupled to an electronic device and configured to:
      receive data representative of a periodicity of interrupt signals of a processor of the electronic device,
         the interrupt signals having been triggered by computer mouse movement events associated with a computer mouse of the electronic device;
      generate, using a machine learning algorithm based on the data, a statistical model, the statistical model representative of a typical periodicity of the interrupt signals associated with a legitimate user of the electronic device;
      receive an indication of the interrupt signals from the electronic device during a given browsing session of the web resource;
      determining, based on the indication of the interrupt signals, a current periodicity of interrupt signals for the given browsing session;
      compare the current periodicity of the interrupt signals with the typical periodicity of the interrupt signals associated with the legitimate user;
      in response to detecting a deviation between the current periodicity of the interrupt signals and the typical periodicity of the interrupt signals, generate a notification determining a presence of a remote connection to the given browsing session;
      transmit the notification to an entity associated with the web resources.

7. The system of claim 6, wherein the server is configured to receive the indication of the interrupt signals from the electronic device from a browser executed by the electronic device, the browser having been configured to load a script including an interrupt handler for collecting and transmitting the data representative of the periodicity of the interrupt signals on the electronic device.

* * * * *